United States Patent

[11] 3,566,153

[72] Inventor Ralph F. Spencer, Jr.
Dallas, Tex.

[21] Appl. No. 820,534

[22] Filed Apr. 30, 1969

[45] Patented Feb. 23, 1971

[73] Assignee Texas Instruments Incorporated
Dallas, Tex.

[54] PROGRAMMABLE SEQUENTIAL LOGIC
8 Claims, 4 Drawing Figs.

[52] U.S. Cl. .......... 307/205, 307/215, 307/251, 307/304, 340/166

[51] Int. Cl. .......... H03k 19/08

[50] Field of Search .......... 307/205, 215, 304, 220, 251; 340/166FE, 166EL, 166R; 328/158, 159

[56] References Cited

UNITED STATES PATENTS 3,493,932 2/1970 HWA N. YU .......... 307/304X

OTHER REFERENCES

Gurski, Field Effect Transistor Read-Only Storage Unit, IBM Technical Disclosure Bulletin, April 1965, pp 1107, 1108. 307/304

Moore et al, Metal Oxide Transistor Decode Circuit, IBM Technical Disclosure Bulletin, November 1966, pp 703 & 704. 307/304

*Primary Examiner*—Stanley T. Krawczewicz

*Attorneys*—James O. Dixon, Andrew M. Hassell, Harold Levine, Melvin Sharp, John E. Vandigriff, Henry T. Olsen and Michael A. Sileo, Jr.

ABSTRACT: A mass production sequential logic circuit which can be custom programmed by modification of a single fabrication mask to perform sequential combinational logic is disclosed. The circuit includes a first programmable matrix of voltage controlled devices for generating product terms, a second programmable matrix of voltage controlled devices for summing the product terms, a plurality of binary storage elements such as flip-flops or shift registers, input inverters and output buffers on the same semiconductor substrate. The outputs of the second matrix are applied either to the inputs of the storage elements, or to the output buffers, or both. The outputs of the storage elements are applied either to inputs of the first matrix, or to output buffers, or both.

INVENTOR

RALPH F. SPENCER, JR.

ATTORNEY

INVENTOR
RALPH F. SPENCER, JR.

ATTORNEY

INVENTOR
RALPH F. SPENCER, JR.
ATTORNEY

PROGRAMMABLE SEQUENTIAL LOGIC

This invention relates generally to logic circuits, and more particularly to a programmable sequential logic circuit suitable for embodiment in semiconductor integrated circuit form. According to copending patent application, Ser. No. 820,535, by Robert J. Proebsting, entitled "Programmable Random Logic," filed concurrently herewith and assigned to the assignee of the present application, an approach is disclosed for performing random logic on a single substrate utilizing a programmable matrix of potential metal-insulator-semiconductor (MOS) transistors programmed to form actual transistors for generating the product terms of a relatively large number of inputs and another programmable matrix of potential transistors programmed to produce the sums of selected ones of the product terms. According to the present invention, the capability and utility of the aforementioned logic circuit are increased in a manner that storage means is incorporated on the single substrate so that the logic circuit output states depend only on the present circuit input states but also on the prior output states to perform sequential logic compatible with many binary digital machines such as desk top calculators, computer I/O terminals, and digital computers which perform sequential functions such as timing control, period of sequence generation, counting, memory storage, time delay, pulse shaping and threshold detection. These kinds of sequential functions require circuits such as J-K flip-flops, shift registers, toggle flip-flops, monostable multivibrators, Schmidt triggers and latches and other circuits which may be implemented according to the present invention.

The invention, as well as other objects, features and advantages thereof, may best be understood by reference to the following detailed description of an illustrative embodiment, when read in conjunction with the accompanying drawings, wherein.

Figure 1:
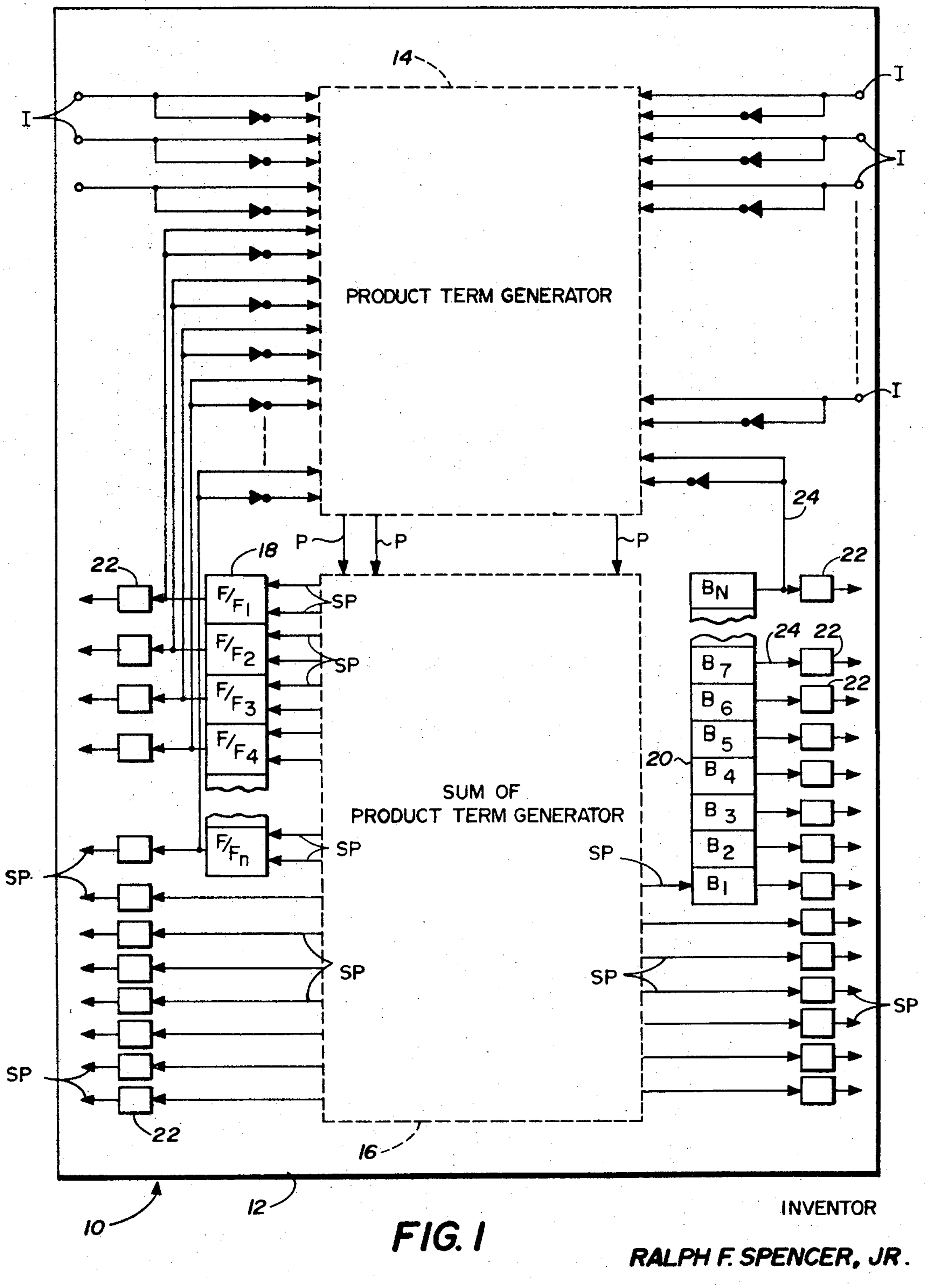
FIG. 1 is a schematic block diagram of an integrated circuit in accordance with the present invention.

Referring now to the drawings, and in particular to FIG. 1, a sequential logic circuit of voltage control devices such as metal-insulator-semiconductor (MOS) transistors in accordance with the present invention is indicated generally by the reference numeral 10. In the preferred embodiment, the circuit 10 is fabricated on a substrate 12 comprised of a single monolithic semiconductor wafer which is typically signal single crystal silicon. However, the substrate may be other semiconductors such as germanium or gallium arsenide or silicon formed on sapphire or other accordance with the present invention. The circuit includes a product term generator 14 which has a plurality of true binary inputs I, each of which is inverted to provide complement inputs $\overline{I}$, and a plurality of binary product term outputs or their complements P. The outputs P are the inputs of a sum of product term generator 16. The sum of product term generator 16 has a plurality of outputs SP. Based on current MOS integrated circuit fabrication technology, the product term generator may have from 20—40 true binary inputs I and inputs from the storage elements, from 60—100 product term outputs P, the sum of the product term generator from 20—40 sum of product outputs SP including external outputs and outputs to the storage elements, and 4—10 J-K flip-flops for example.

Also formed on the substrate 12 are a plurality of binary storage devices such as flip-flops, indicated generally by the reference numeral 18, and a shift register 20. The flip-flops 18 and shift register 20 are selected by way of illustration only. The storage devices may be clocked, although the clock lines are not illustrated.

The sum of product outputs SP, as well as the outputs from the flip-flops 18 and shift register 20, are applied to output buffers 22, which are also formed on the substrate 12. The respective outputs from the flip-flops 18 are also connected back to inputs I to the product term generator 14, as are one or more of the outputs 24 from the shift register 20.

Figure 2:
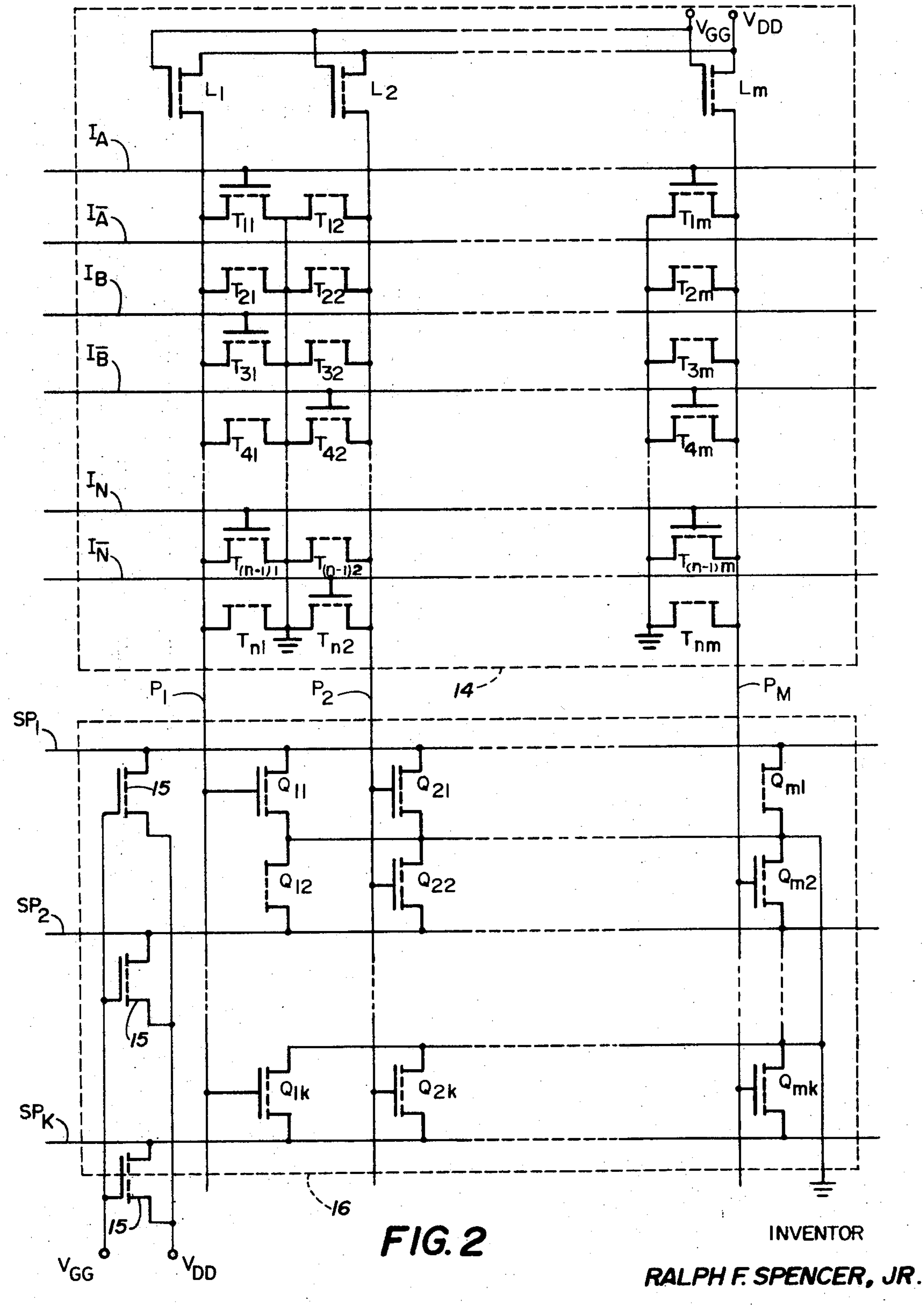
FIG. 2 is a schematic circuit diagram circuit of a portion of the circuit of FIG. 1.

Referring now to FIG. 2, the product term generator 14 is comprised a matrix of potential metal-insulator-semiconductor field effect transistors which are arrayed in input rows and output columns. For example, the top input row includes potential transistors $T_{11}$—$T_{1m}$, and the left-hand output column includes potential transistor $T_{11}$—$T_{n}$. The drains of the potential transistors in each output column are common with the respective product term outputs $P_1$—$P_M$ and are connected through load transistors $L_1$—$L_m$ to a negative voltage supply $V_{DD}$. The gates of the load transistors are common and are connected to a negative voltage $V_{GG}$ so as to provide a load resistance. The source of all transistors are common and are connected to ground.

The product term generator is programmed 1 provide actual transistors by effectively connecting selected gates of the potential transistors to the respective inputs. For example, if inputs $I_A$, $I_B$ and $I_N$ are connected to the gates of transistors $T_{11}$, $T_{31}$ and $T_{(n-1)1}$, product term output $P_1$ will represent the product term $\overline{I_A I_B I_N}$, when using p-channel transistors and positive logic, where ground is logic 1 and the negative voltage is logic 0. Similarly, if inputs $I_{\overline{B}}$ and $I_{\overline{N}}$ are effectively connected to the gates of transistors $T_{42}$ and $T_{n2}$ , product term output $P_2$ will be equal to $I_{\overline{B}} I_{\overline{N}}$. If inputs $I_A$, $I_{\overline{B}}$ and $I_N$ are connected to the gates of transistors $T_{1m}$, $T_{4m}$ and $T_{(n-1)m}$, product term output $P_M$ will be equal to $\overline{I_A I_B I_N}$.

The sum of product term generator 16 is similarly comprised of a matrix of potential transistors arrayed in input columns and in output rows. The drains of the transistors $Q_{11}$-—$Q_{ml}$ in top output row are common and form sum of product term output $SP_1$, the drains of the transistors $Q_{12}$—$Q_{M2}$ in the second output row are common and form sum of product term output $SP_2$, and the drains of transistors $Q_{1k}$—$Q_{mk}$ in the bottom output row are common and form sum of product term output $SP_K$. Each product term output SP is connected through a load transistor 15 to the negative voltage supply $V_{DD}$ and the gates of the load transistors are connected to the negative gate supply voltage $V_{GG}$. The sources of all of the transistors of the sum of product term generator 16 are common and are connected to ground.

The sum of products term generator 16 is programmed by forming actual transistors selectively connected to the product term outputs $P_1$—$P_M$. For example, product term output $P_1$ is connected to the gates of actual transistors $Q_{11}$ and $Q_{lk}$, product term output $P_2$ is connected to the gate of actual transistors $Q_{21}$, $Q_{22}$ and $Q_{2k}$, and product term output $P_M$ is connected to the gates of actual transistors $Q_{m2}$ and $Q_{mk}$. Accordingly, the circuit of FIG. 2 is expressed as:

$SP_1 = \overline{P}_1 + \overline{P}_2 = I_A I_B I_N + I_{\overline{B}} N$, $SP_2 = \overline{P}_2 + \overline{P}_M = I_{\overline{B}} I_{\overline{N}} + I_A I_{\overline{B}} I_N$, and $SP_K = \overline{P}_1 + \overline{P}_2 + \overline{P}_M = I_A I_B I_N + I_{\overline{B}} I_N + I_A I_{\overline{B}} I_N$ when using the same positive logic and p-channel transistors mentioned previously. All the potential and actual transistors of the matrices are not specifically illustrated for simplicity.

It will be noted that each output column of potential transistors in the product term generator 14 functions as a NAND gate and that each output row of actual transistors of the sum of product term generator 16 similarly functions as a NAND gate when using P-channel devices and positive logic. The transistors may also be n-channel devices, in which case negative logic and the same program would perform the same logic functions. If either p-channel devices and negative logic (where the more negative voltage represents the logic 1 state), or n-channel devices and positive logic are used on the other hand, both matrices 14 and 16 function as NOR gates. Then the first matrix may be considered a programmable sum term generator and the second matrix a programmable product of sum term generator. For example, if negative logic is used with p-channel transistors programmed as illustrated in FIG. 2, the output functions become:

$SP_1 = \overline{P}_1 \cdot \overline{P}_2 = (I_A + I_B + I_N)(I_{\overline{B}} + I_{\overline{N}})$, $$SP_2 = \overline{P}_2 \cdot \overline{P}_M = (I_{\overline{B}} + I_{\overline{N}})(I_A + I_{\overline{B}} + I_N), \text{ and}$$
$$SP_K = \overline{P}_1 \cdot \overline{P}2 \cdot \overline{P}3 = (I_A + I_B + I_N)(I_{\overline{B}} + I_{\overline{N}})(I_A + I_{\overline{B}} + I_N).$$

The same output function would be produced using n-channel transistors and positive logic. Accordingly, the term "product term generator" used herein also comprehends a "sum term" generator when using p-channel devices and negative logic or n-channel devices and positive logic, and the term "sum of product term generator" used herein also comprehends a "-product of sum terms" generator when using p-channel devices and negative logic or n-channel devices and positive logic.

Either generator 14 or 16 or both may be grounded source as in the embodiment illustrated or a source follower type circuit, the output being followed as necessary by inverters to provide true or complement logic outputs as required.

Figure 3:
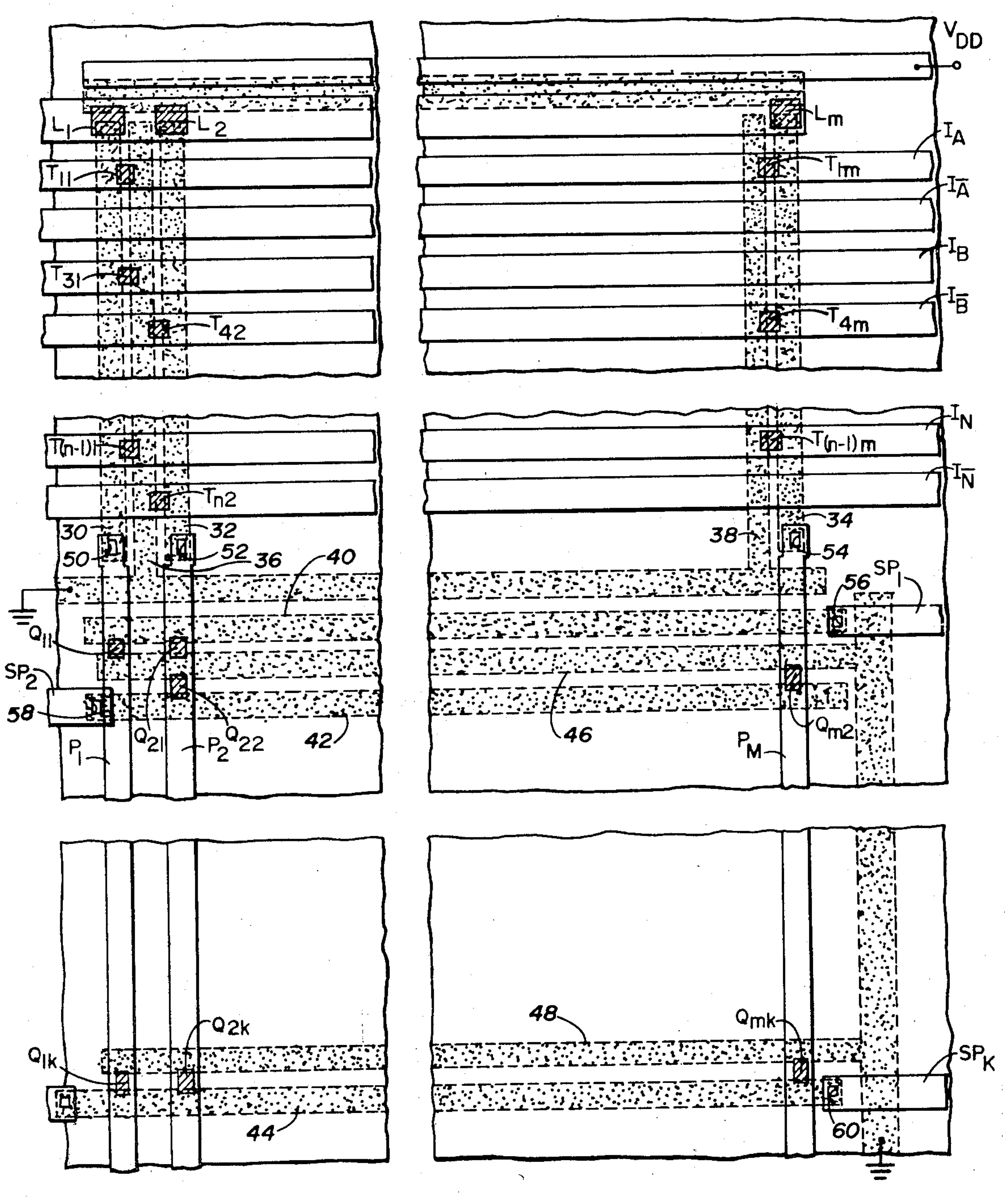
FIG. 3 is a simplified schematic plan view of an integrated circuit illustrating that portion of the circuit shown in FIG. 2.

The portion of the circuit illustrated in FIG. 2 within the dotted outlines is disclosed and claimed in the above-referenced copending U.S. application Ser. No. 820,535 of Robert J. Proebsting, which is incorporated herein by reference. This circuit is illustrated in the fragmented schematic plan view of FIG. 3 wherein corresponding circuit elements are designated by corresponding reference characters. The process for fabricating the circuit of FIG. 3 is described in detail in copending U.S. Pat. application Ser. No. 567,459 of Crawford and Biard, entitled "Binary Decoder" filed Jul. 25, 1966, and assigned to the assignee of the present application. The specification of said copending application entitled "Binary Decoder" is incorporated herein by reference. The process generally involves using a single diffusion step to form all of the diffusions of the circuit which are shown in dotted outline and are lightly stippled for emphasis. For example, diffusion 30 forms the common drain for the transistors in the left-hand output column, thus forming product term output $P_1$, diffusion 32 forms the common drain for the transistors in the second output column, thus forming product output $P_2$, and diffusion 34 forms the common drain for the transistors in right-hand output column, thus forming product term output $P_M$. Diffusions 36 and 38 form the common sources for these transistors. Similarly, diffusions 40, 42 and 44 form the drains of the transistors in three output rows which form the sum of product term outputs $SP_1$, $SP_2$ and $SP_K$, respectively. Diffusions 46 and 48 form the common source diffusions for all transistors in the sum of product term generator 16.

The entire slice is covered with a layer of insulation, such as a silicon dioxide, except in areas where metal contact is to be made with an underlying diffused region. Metal strips $I_A$—$I_{\overline{N}}$ and $P_1$—$P_M$ are then formed on the insulating layer and extend at an angle to the underlying diffused regions so that a potential transistor is formed at the intersection of each of the metal strips and adjacent source and drain regions. The metal strips $P_1$—$P_M$ are in electrical contact with respective common drain regions, through windows or openings 50, 52 and 54, for example, in the insulating layer.

The oxide layer may be formed by two different steps so that it may be made selectively thin at the potential transistor sites where an actual transistor is desired, and made thick at those potential transistor sites where no transistor is required to perform the desired logic function. Thus, when the matrices of potential transistors are programmed as illustrated in FIGS. 2 and 3, actual transistors are formed at site $T_{11}$, $T_{1m}$, $T_{31}$, $T_{42}$, $T_{4m}$, $T_{(n-1)1}$, $T_{(n-1)m}$ and $T_{n2}$ in the product term generator 14, and at sites $Q_{11}$, $Q_{21}$, $Q_{22}$, $Q_{m2}$, $Q_{1k}$, $Q_{2k}$ and $Q_{mk}$ in the sum of product term generator 16. Outputs $SP_1$, $SP_2$, and $SP_M$ are metallized strips connected to the respective diffused regions 40, 42 and 44 through openings 56, 58 and 60, respectively, in the oxide.

The flip-flops 18, shift register 20, output buffers 22, as well as the inverters D at the inputs of the product term generator 14 may be formed during the same fabrication steps as the generators 14 and 16, and may be of any desired form.

In practice, a family of the sequential logic circuits 10 may be designed based upon the number of binary logic inputs I, the number of product terms, the number of binary logic outputs from the buffers 22, and the number and type of binary storage elements. Then all of the masks used in fabricating each standard circuit would be identical except for the mask defining the location of the thin oxide areas forming the actual transistors. This would be programmed to produce the product terms at the outputs $P_1$—$P_M$, and then the sum of product terms at the outputs SP for the particular application of the circuit. This mask can also be used to program the openings in the insulating layer so that the metallization layer will interconnect the inputs and outputs of the generators and the storage elements in a variety of selectable combinations to accomplish substantially any desired sequential logic functions. Such programming can readily be accomplished and the mask generated by a digital computer. Alternatively, the metallization mask can be programmed to make different connections between the inputs and outputs of the generators and binary storage elements, or to even program the matrices of the generators 14 and 16.

This custom programming permits a single circuit 10 to be used to perform any sequential logic within the input, output, product term and binary storage capacity of the circuit. For example, it is well within current technology to provide a sequential logic circuit having 25 true inputs I, plus the complements, to the product term generator 14, 100 product term outputs P, and 25 sum of product term outputs SP. The number of binary storage elements or bits may vary over a wide range since these elements do not occupy as must space on the substrate as do the generator matrices 14 and 16. Moreover, the invention may be practiced using a complementary transistor approach where n-channel and p-channel transistors are used with the n-channel transistors provided in the matrices and the p-channel transistors provided as load impedances or vice versa on the load impedances may be deposited resistors on the oxide or other resistance means.

Figure 4:
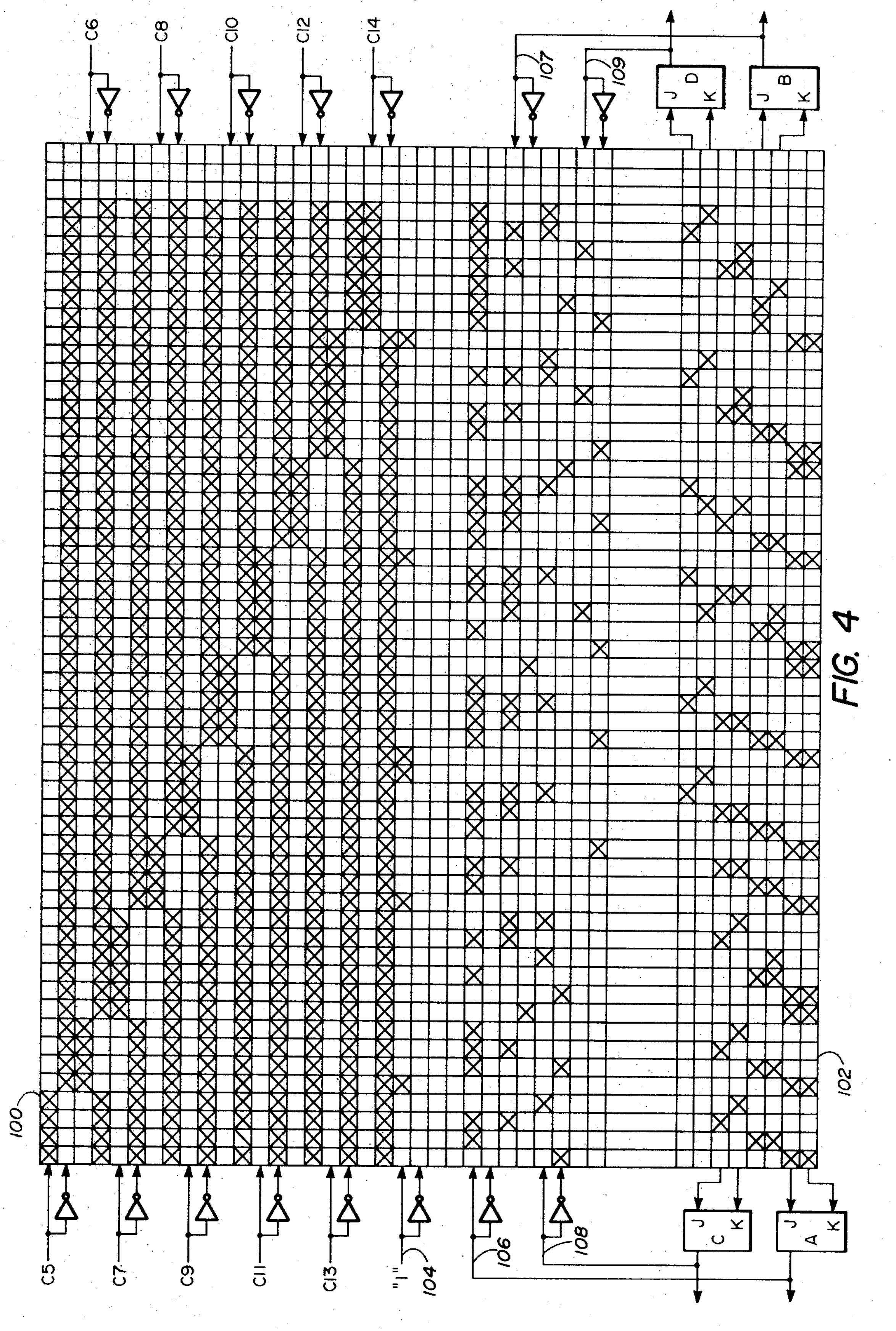
FIG. 4 is a schematic illustration of a variable modulus counter embodying the present invention.

FIG. 4 is a schematic illustration of a variable modulus four bit counter embodying the present invention. The counter has four J-K flip-flops A,B,C and D, a product term generator 100 and a sum of product term generator 102. True inputs $C_5$—$C_{14}$, together with the complement of each, are applied to the input rows of the product term generator 100. A constant logic 1 is provided at input 104 for the flip-flops A,B and D to perform the counting modulus of the given example. The outputs of the flip-flops are also outputs of the substrate. Accordingly, in the given example, there are 10 true binary inputs, 1 constant input, 53 product term outputs, 8 sum of product term outputs, 4 binary storage elements and 4 external outputs. The actual transistors in the product term generator matrix 100 and the sum of product term generator matrix 102 are indicated by the X'd squares, the blank squares indicating potential transistor sites which are not utilized. Only one of the inputs $C_5$—$C_{14}$ is raised to a logic 1 level at any point in time. The counter then counts through cycles of from 5 to 14, depending upon which of the respective inputs $C_5$—$C_{14}$ is a logic 1. This variable modulus counter is illustrated merely by way of example. It will be appreciated that substantially more complex systems are economically and practicably feasible using the present invention.

Although a preferred embodiment of the invention has been described in detail, it is to be understood that various changes, substitutions, and alterations can be made therein without departing from the spirit and scope of the invention.

I claim:

1. The logic circuit comprising a product term generator, a sum of product term generator, and at least 1 binary storage element formed on a substrate, the outputs of the product term generator being connected to the input of the sum of product term generator, and the input of the binary storage element being connected to an output of the sum of product term generator.

2. The logic circuit of claim 1 wherein the product term generator and the sum of product term generator each comprises:

at least three generally parallel, elongated regions of one conductivity type formed in a substrate of the other conductivity type;

a layer of insulation disposed over the surface of the substrate; and a plurality of generally parallel, conductive strips disposed over the layer of insulation and extending over at least three of said elongated regions at angles thereto to form potential transistors at the intersections of the conductive strips and adjacent pairs of said elongated regions of the other conductivity type;

the relationship of the adjacent said elongated regions, the areas of the conductive strips, and the layer of insulation at said intersections being such as to form transistors only at selected intersections.

3. The logic circuit of claim 1 wherein the product term generator comprises: a plurality of MOS transistors, the transistors being arrayed in a number of input rows and a number of output columns, the input rows and output columns being disposed generally in orthogonal relationship, the gates of the transistors in each input row being common, the drains of the transistors in each output column being common and being connected through a load resistance to the drain supply voltage, and the sources of all of the transistors being common, and the number of actual transistors in at least one output column being less than the number of true inputs to said at least one output column.

4. The logic circuit of claim 3 wherein the sum of product term generator comprises: a second plurality of MOS transistors, said second plurality of transistors being arrayed in a number of input columns and a number of output rows, the input columns and output rows being disposed generally in orthogonal relationship, the gates of the transistors in each input column being common, the drains of the transistors in each output row being common and being connected through a load resistance to a drain supply voltage, and the sources of all of the second plurality of transistors being common.

5. The logic circuit defined in claim 4 wherein the output of at least 1 binary storage element is connected to at least one input of the product term generator.

6. The logic circuit defined in claim 5 wherein the circuit includes a plurality of flip-flops each comprised of MOS transistors.

7. The logic circuit defined in claim 5 wherein the circuit includes a shift register comprised of MOS transistors.

8. The logic circuit comprising:

a product term generator having a plurality of binary inputs, a plurality of product term outputs, and logic means for producing logic signals on selected product term outputs representative of the complement of the logical products of the logic signals at selected binary inputs;

a sum of product term generator having a plurality of product term inputs connected to the product term outputs, a plurality of sum of product term outputs, and logic means for producing a logic signal on selected sum of product term outputs representative of the complement of the sum of selected logic signals at the product term inputs; and a plurality of binary storage elements each having a logic input and a logic output, the logic inputs of the storage elements being connected to selected logic outputs of the generators and the logic outputs of the storage elements being connected to selected logic inputs of the generators.